US010795648B2

(12) United States Patent
Petrillo et al.

(10) Patent No.: US 10,795,648 B2
(45) Date of Patent: Oct. 6, 2020

(54) SYSTEMS AND METHODS OF DEVELOPMENTS, TESTING, AND DISTRIBUTION OF APPLICATIONS IN A COMPUTER NETWORK

(71) Applicant: Google LLC, Mountain View, CA (US)

(72) Inventors: Michael Petrillo, Emerald Hills, CA (US); Atul Kumar, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 165 days.

(21) Appl. No.: 15/828,071

(22) Filed: Nov. 30, 2017

(65) Prior Publication Data

US 2019/0163450 A1 May 30, 2019

(51) Int. Cl.
| | |
|---|---|
| G06F 9/44 | (2018.01) |
| G06F 8/34 | (2018.01) |
| G06F 8/35 | (2018.01) |
| G06F 17/18 | (2006.01) |
| G06F 17/15 | (2006.01) |
| H04L 29/08 | (2006.01) |
| H04W 4/50 | (2018.01) |
| H04W 4/60 | (2018.01) |
| G06F 8/71 | (2018.01) |
| G06F 9/445 | (2018.01) |

(52) U.S. Cl.
CPC .................. *G06F 8/34* (2013.01); *G06F 8/35* (2013.01); *G06F 8/71* (2013.01); *G06F 17/15* (2013.01); *G06F 17/18* (2013.01); *H04L 67/34* (2013.01); *H04W 4/50* (2018.02); *H04W 4/60* (2018.02); *G06F 9/44521* (2013.01)

(58) Field of Classification Search
CPC ......................................................... G06F 9/44
See application file for complete search history.

(56) References Cited

U.S. PATENT DOCUMENTS

| | | | | |
|---|---|---|---|---|
| 8,008,034 | B2 * | 8/2011 | Gibbons | .............. G01N 33/542 |
| | | | | 435/7.91 |
| 8,261,231 | B1 | 9/2012 | Hirsh et al. | |
| 9,513,891 | B2 | 12/2016 | Sun et al. | |
| 9,658,739 | B1 * | 5/2017 | Freund | ................ G06F 3/04817 |

(Continued)

FOREIGN PATENT DOCUMENTS

CN 104102489 A 10/2014

*Primary Examiner* — Jae U Jeon

(74) *Attorney, Agent, or Firm* — Shumaker & Sieffert, P.A.

(57) ABSTRACT

Systems and methods of the disclosed subject matter are directed to receiving, at a server having a mobile application publishing platform, application information. The server determines a plurality of product modules based on the received application information. An affinity score for each of the product modules is dynamically determined from the received application information. The server provides at least one of the plurality of product modules for selection based on the dynamically determined affinity score. The server receives a selection of at least one of the plurality of product modules that is provided for selection based on the dynamically determined affinity score. The server generates an application that integrates the selected at least one of the plurality of product modules with the received application information so that the generated application includes a feature provided by the integrated at least one of the plurality of product modules.

21 Claims, 10 Drawing Sheets

(56) References Cited

U.S. PATENT DOCUMENTS

| | | | |
|---|---|---|---|
| 2006/0168355 A1* | 7/2006 | Shenfield | H04L 67/20 709/250 |
| 2009/0138898 A1* | 5/2009 | Grechanik | G06F 8/20 719/328 |
| 2009/0178026 A1* | 7/2009 | Mital | G06F 8/36 717/120 |
| 2010/0049534 A1* | 2/2010 | Whitnah | G06Q 30/02 705/319 |
| 2010/0257127 A1* | 10/2010 | Owens | G06N 7/005 706/12 |
| 2010/0281475 A1 | 11/2010 | Jain et al. | |
| 2013/0159103 A1* | 6/2013 | Foroughi | G06Q 30/0269 705/14.53 |
| 2014/0053126 A1 | 2/2014 | Watson et al. | |
| 2015/0161386 A1* | 6/2015 | Gupta | G06F 11/3612 726/23 |
| 2015/0281878 A1* | 10/2015 | Roundtree | H04W 4/80 455/41.2 |
| 2015/0381709 A1* | 12/2015 | Word | H04L 49/90 709/203 |
| 2016/0170712 A1 | 6/2016 | Luan | |
| 2016/0196270 A1* | 7/2016 | DiMaria | G06F 16/48 707/749 |
| 2017/0131978 A1 | 5/2017 | Iyer et al. | |
| 2017/0228229 A1 | 8/2017 | Jain et al. | |
| 2017/0251259 A1* | 8/2017 | Klappert | H04N 21/4668 |

* cited by examiner

FIG. 2

Select Application File(s):

File Directory 210

Application_1
Application_2
Graphics_1
Video_1
Audio_1
Images_1
Images_2
Icon_1
Icon_2
...

UPLOAD 220

Select Genre(s) of Application:

Genre(s) 230

Music
Real Estate
Business
Games
Finance
Food & Drink
Entertainment
Shopping
...

Application Name [APPLICATION NAME TEXT 310]

SUBMIT 320

Enter Text Description of Application:

| Application Description |
|---|
| [TEXT DESCRIPTION OF APPLICATION ENTERED BY USER 330] |

SUBMIT 340

Enter Keywords Related to Application:

| Keywords |
|---|
| [KEYWORDS RELATED TO APPLICATION ENTERED BY USER 360] |

SUBMIT 370

Select Default Language of Application:

| Default Language 410 |
|---|
| English |
| Spanish |
| French |
| Chinese (Mandarin) |
| Japanese |
| Russian |
| Hindi/Urdu |
| Arabic |
| Portuguese |
| German |
| Bengali |
| ... |

SUBMIT 420

Select Geographic Region(s) of Application:

| Geographic Region(s) 430 |
|---|
| United States |
| Canada |
| Mexico |
| Europe |
| Middle East |
| South America |
| Japan |
| Korea |
| China |
| India |
| ... |

SUBMIT 440

FIG. 5

Release Date

[DATE 510]

SUBMIT 520

Select Pricing of Application:

| Pricing 530 |
|---|
| Free |
| 0.99 |
| 1.99 |
| 2.99 |
| 3.99 |
| 4.99 |
| ... |

SUBMIT 540

Testing Product Modules

| Module Configuration 710 | Product Module 720 | Traffic Selection Percentage 730 |
|---|---|---|
| Module_config_1 | Speech Module 1 | 25% |
| Module_config_2 | Speech Module 2 | 25% |
| Module_config_3 | Speech Module 3 | 25% |
| Module_config_4 | Speech Module 4 | 25% |

| Performance Goals 740 | |
|---|---|
| Performance Watchlist 1 | % Search Completed |
| Performance Watchlist 2 | % Utterances Recognized |

TEST 750

Testing Results

| Performance Watchlist 1 -- % Search Completed 810 | |
|---|---|
| (1) Speech Module 3 | 93% |
| (2) Speech Module 1 | 86% |
| (3) Speech Module 4 | 72% |
| (4) Speech Module 2 | 66% |

| Performance Watchlist 2 -- % Utterances Recognized 820 | |
|---|---|
| (1) Speech Module 1 | 84% |
| (2) Speech Module 4 | 78% |
| (3) Speech Module 3 | 75% |
| (4) Speech Module 2 | 68% |

800

SYSTEMS AND METHODS OF DEVELOPMENTS, TESTING, AND DISTRIBUTION OF APPLICATIONS IN A COMPUTER NETWORK

BACKGROUND

Conventional application publishing platforms provide a developer with a platform for uploading their applications and from which users can purchase applications. Typically, the developer can control distribution aspects such as pricing and geographical coverage from the platform. The provider of the platform often has some control over the applications available to maintain quality. Some platforms notify the developer of any missing application requirements before the application can be published. In some instances, a platform may notify the developer of new features of the platform.

BRIEF SUMMARY

According to an implementation of the disclosed subject matter, a method is provided that includes receiving, at a server having a mobile application publishing platform, application information. The method includes determining, at the server, a plurality of product modules based on the received application information. The product module may be stored or accessed from a library. The method includes dynamically determining, at the server, an affinity score for each of the product modules determined from the received application information. The method includes providing, by the server, at least one of the plurality of product modules for selection based on the dynamically determined affinity score. The method includes receiving, at the server, a selection of at least one of the plurality of product modules that is provided for selection based on the dynamically determined affinity score and generating, at the server, an application that integrates the selected at least one of the plurality of product modules with the received application information. The generated application may include a feature provided by the integrated at least one of the plurality of product modules. The method may be summarized as a method of developing applications. The method may be implemented by a computing system, server, network or a distributed computing system. The product module may also be known as a program module.

According to an implementation of the disclosed subject matter, a system is provided that includes a storage device and a server, communicatively coupled to the storage device, having a mobile application publishing platform. The servers receives, via a communications interface, application information, and determines, at a processor of the server, a plurality of product modules stored in the storage device based on the received application information. The processor of the server dynamically determines an affinity score for each of the product modules determined from the received application information. The server provides at least one of the plurality of product modules for selection based on the dynamically determined affinity score. The server receives, via the communications interface, a selection of at least one of the plurality of product modules that is provided for selection based on the dynamically determined affinity score. The processor of the server generates an application that integrates the selected at least one of the plurality of product modules with the received application information so that the generated application includes a feature provided by the integrated at least one of the plurality of product modules. The system may be summarized as a system for developing applications.

According to an implementation of the disclosed subject matter, means for generating and publishing an application are provided. The means include receiving, at a server having a mobile application publishing platform, application information. The server determines a plurality of product modules based on the received application information. The server dynamically determines an affinity score for at least one of the plurality of product modules determined from the received application information. The server provides at least one of the plurality of product modules for selection based on the dynamically determined affinity score. The server receives a selection of the least one of the plurality of product modules that is provided for selection based on the dynamically determined affinity score and generates an application that integrates the selected at least one of the plurality of product modules with the received application information so that the generated application includes a feature provided by the integrated at least one of the plurality of product modules.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIGS. 2-5 show display screens to receive application information according to an implementation of the disclosed subject matter.

FIG. 7 shows testing of selected product modules according to an implementation of the disclosed subject matter.

FIG. 8 shows product module testing results according to an implementation of the disclosed subject matter.

DETAILED DESCRIPTION

Figure 1:
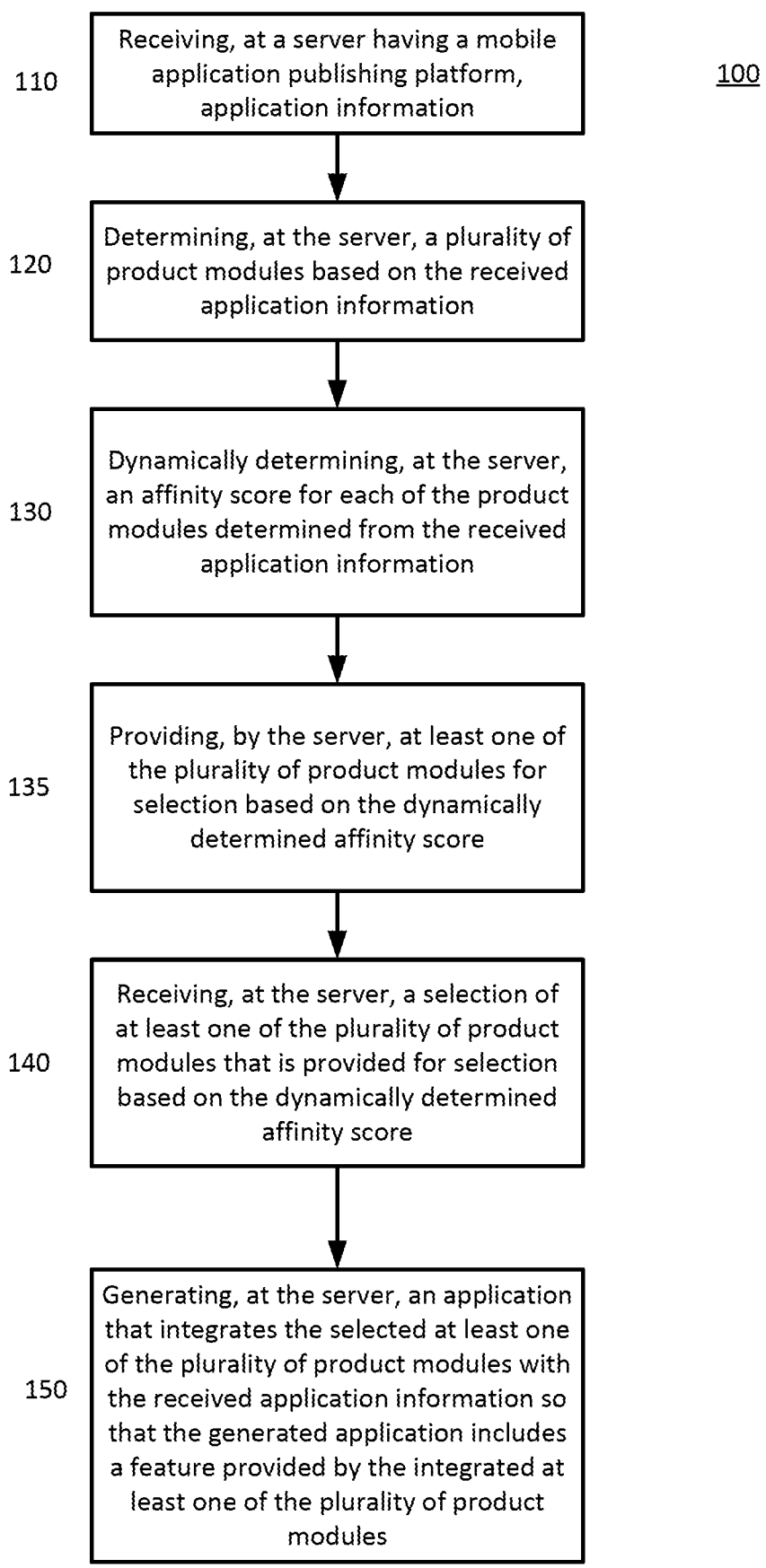
FIG. 1 shows a method of generating and publishing an application according to an implementation of the disclosed subject matter.

The disclosed invention relates to an application ("app") development and publishing platform. The platform allows for submission by a developer of application code and/or descriptive information, images, video, or the like to be used to generate an application and/or improve the functionality, features, and/or performance of an application on a computing device and/or for use within a computer network. The platform of the disclosed subject matter allows developers of various programming skill levels to develop and publish applications.

The information submitted by the developer may be used to determine the application genre or the developer may specify the genre as part of application submission process. Once the genre has been determined, the platform may suggest or recommend product modules to be added or used with the application to be developed. These product modules, when selected and integrated, may add features and/or functionality to the application. For example, the platform may suggest product modules such as a speech-to-text module, a mapping module, and/or a purchasing module (e.g., shopping cart and purchase transaction module) that may be relevant to the development, functionality, and/or performance of the application on a computing device and/or within a computer network. That is, the recommended product module may provide additional features and/or functionality, or support the functionality of an application to be generated and published. The recommended product module may replace an alternative product module or append to the application to provide additional features and/or functionality. Interfacing between the recommended product module and the application may be through a common series of arguments (e.g., an Application Programming Interface "API"). For example, interfacing between an application and a mapping module may be provided by the application providing an address or destination and the product module returning the map. Mapping modules in general may have the same interfacing arguments (that is, input=[address], output=[map]). Similarly, a speech-to-text product module may return a text string after receiving an instruction to initiate the module. In general other speech-to-text modules may have the same interfacing (that is, input=[initiate], output=[text string]). This commonality of interfacing allows product modules to be swapped readily without significant rewriting of code in the application or product module.

Before recommending product modules, the platform may generate an affinity score for possible product modules by, for example, examining one or more product modules in other existing applications of a similar genre, and relevant product modules may be suggested to the developer for integration with the application. For example, the suggested product modules may be provided in a stacked arrangement where the modules are ordered based on affinity scores, with the product module with the highest affinity score appearing first in the stack. The developer can select one or more of the recommended product modules of the stack to be integrated with the application.

The developer can also test the operating performance of application with the selected modules, and perform AB testing of various modules that may be used with the application. That is, the application performance with different recommended modules may be compared. Additionally, original modules of an application may be compared with recommended modules.

Implementations of the disclosed subject matter are directed to a technical problem of improved application development, such as for mobile computing devices. The technical solution results in providing to a developer, at a publishing platform, recommendations of program modules relevant a to a developer's application, application type or genre. By recommending these program modules, the publishing platform may allow the developer to improve the quality of his application product as well as increase how quickly a developer can complete development of an application. Such recommended program modules may also provide additional features and/or functionality more readily. Furthermore, because a program module provided by a publishing platform provider may be more extensively tested than by a developer and may be continually updated, program modules and applications in which they are included may be more reliable than those which are produced by the developer alone.

A further technical problem addressed by this disclosure is how to improve consistency of common functions across applications provided by multiple developers. As a result of the techniques in this disclosure, multiple developers may be encouraged to incorporate the same program modules such that users of applications will experience consistency among applications across different developers. Hence, a user may experience application features that he or she is more accustomed to or has familiarity with. This consistency of approach may also have benefits in applications where regulatory control is present.

Generally, application ("app") publishing platforms provide developers and other users an interface to upload files, and provide options to control various aspects of distribution, such as the intended geographic distribution of the application, pricing, the devices capable of using the application, and analytics to monitor performance and earnings.

Current application publishing platforms can be viewed as non-intelligent web forms, as they rely on the application developer to be aware of and structure an application that utilizes the capabilities of underlying platform provider. This reduces a developer's ability to develop an application, and may result in an application that is suboptimal, as the application could have additional features and/or improved functionality by using one or more product modules provided by the application publishing platform and/or from one or more of different providers.

Implementations of the disclosed subject matter provide application development assistance, development tools, product modules, and application performance testing so improve the features, capabilities, functionality, and performance of the application on a computing device and within a communications network.

Some application development platforms have attempted to assist developers in developing an application. For example, such development platforms provided notification or alerts, where developers are notified for any missing requirement before the application could be published (e.g., alerting a developer regarding a missing content rating for an application when it is mandatory, or providing notification of a new service tax on in-application sales). In another example, such development platforms marketed a new feature or product (e.g., a new template for pricing, or a different analytics report integrated with a new service). The assistance provided by such application development platforms do not provide targeted assistance to developers of an application so as to improve the operation, features, and/or functionality of the application on a device and/or with computer networks.

Implementations of the disclosed subject matter provide an application development platform which assists a developer in developing and publishing an application, and improving the performance of the application for a computing device and computer networks.

In some implementations, a server (e.g., server 13 shown in FIG. 10 and discussed below) may have an initial mapping of <app genre, product modules>. This tuple reflects the relevant product modules for a genre or category of applications. The server may utilize machine learning to determine which product modules are most relevant for one or more genres of applications. The initial mapping may be stored in a storage device communicatively coupled to the server, such as a database (e.g., database 15 shown in FIGS. 10-11).

The server may dynamically generate an affinity score for one or more of the tuples. In recommending product modules to a developer, the server may use application information provided by the developer, and may suggest one or more product modules for the proposed application, which may be ordered by affinity score. That is, for a particular application genre, one or more product modules may be relevant, and can be presented to the developer in stacked order (e.g., ordered by affinity score). In some implementations, a threshold affinity score may be set at the server for recommendations of product modules. That is, the server may not suggest product modules for an application to be developed if the affinity score for a possible suggested product module does not meet or exceed the threshold affinity score. For example, a recommendation engine module or 'speech-to-text' module may be relevant for a music genre application, but an 'optimal delivery route' module may not have an affinity score that meets the threshold for the music application. The optimal delivery route module may be more relevant for, and may have a have higher affinity score, for a delivery application (e.g., food delivery application, grocery delivery application, or the like).

In some implementations, the relevant product modules may be constructed and/or suggested using application store metrics and/or analysis of similar applications of the same or similar genre or category. For example, developers of a music application or a content application would likely be interested in a recommendation engine module and/or a speech detection module. In another example, developers of e-commerce applications may be interested in a shopping cart analytics module, an order pattern module, and/or an item recommendation module.

The server may suggest product module(s) to the developer based on application information provided by the developer to the server. The developer may provide feedback to the server 13 as to whether the suggested product modules are, for example, (1) useful, (2) useful later, and/or (3) not relevant. The server may adjust the affinity score for one or more product modules (e.g., suggested product modules) based on developer input. That is, the server may augment the affinity score for every positive confirmation, and may reduce the score for a negative association.

The server may assist in application development by not suggesting product modules that may already be used and/or previously suggested, honoring developer input, regardless of an affinity score for a product module. For example, if a geolocation based application developer declines the suggested maps module, the server may not suggest the maps module again, despite a high affinity score for the module).

Implementations of the disclosed subject matter may allow a developer to perform performance testing (e.g., A/B testing) with the one or more selected product modules. The developer may test one or more modules that they have developed against the suggested product modules, and/or test the performance of one or more suggested product modules against one another. For example, implementations of the disclosed subject matter may provide developers with the ability to integrate a 'cloud machine learning module' into an application and test it with 10% of traffic to determine if the application performance improves. The improvement may be determined via a report generated by the server, which may show the performance of the module with respect to performance criteria (e.g., performance watchlists), and with respect to other tested modules. The server may increase the affinity score for a module if there is an increase in performance based on the testing, while the server may reduce the affinity score if there is a reported decrease in performance, based on the testing. The relevance of suggested product modules may improve over time, as more developers use the application development and publishing platform. That is, as usage of the platform increases, the affinity scores for product modules may have increased accuracy, and the product modules and applications that are generated may improve.

FIG. 1 shows a method 100 of generating and publishing an application according to an implementation of the disclosed subject matter. The method 100 includes receiving, at a server having a mobile application publishing platform, application information at operation 110. The application information may be received by server 13 and/or remote platform 17 shown in FIG. 10, and/or by remote service 11 and/or processing unit 14 shown in FIG. 11, as described in detail below. The server 13 may receive the application information from, for example, device 10, 11 shown in FIGS. 9-11.

The application information can include an application, one or more code segments, a description of an application, images, audio, video, and the like. The application information may also include one or more genres of the application to be developed and published by the server. The application information received by the server is discussed in detail below in connection with FIGS. 2-5.

At operation 120, the server may determine product modules based on the received application information. In some implementations, the application information can include at least one genre type of the application. As shown in FIG. 2 and as described in detail below, the developer may select one or more genres 230 related to the application to be provided to the server. The server may determine one or more existing applications in a storage device coupled to the server, with each having a genre type that corresponds to that of the determined genre type of the application. The storage device which stores the existing applications may be remote service 11, processing unit 14, database 15, and/or remote platform 17 shown in FIGS. 10-11 and described below.

In some implementations, the server may determine one or more existing applications that each have the genre type that corresponds to that of the determined genre type of the application by determining a statistical correlation between the genre type and one or more product modules of the existing applications. The server may determine the statistical correlation with the dynamically determined affinity score. The affinity score may be based on a weighting factor assigned to the one or more product modules. The statistical correlation is determined from the frequency of application programming interface calls to the one or more product modules.

In some implementations, the server may map a tuple that includes the genre type and the one or more product modules stored in the storage device. That is, the server may map a correspondence between a genre and one or more modules that may be relevant for the genre. The server may revise the tuple mapping and the affinity score based on the use of the one or more product modules, a received input to the server, and the like.

At operation 130, the server may dynamically determine an affinity score for each of the product modules determined from the received application information. In some implementations, the application information is an identification of a genre type, and the program modules may have an affinity score for each genre. In some implementations the at least one product module provided for selection by the server has an affinity score that exceeds a threshold affinity score.

Figure 6:
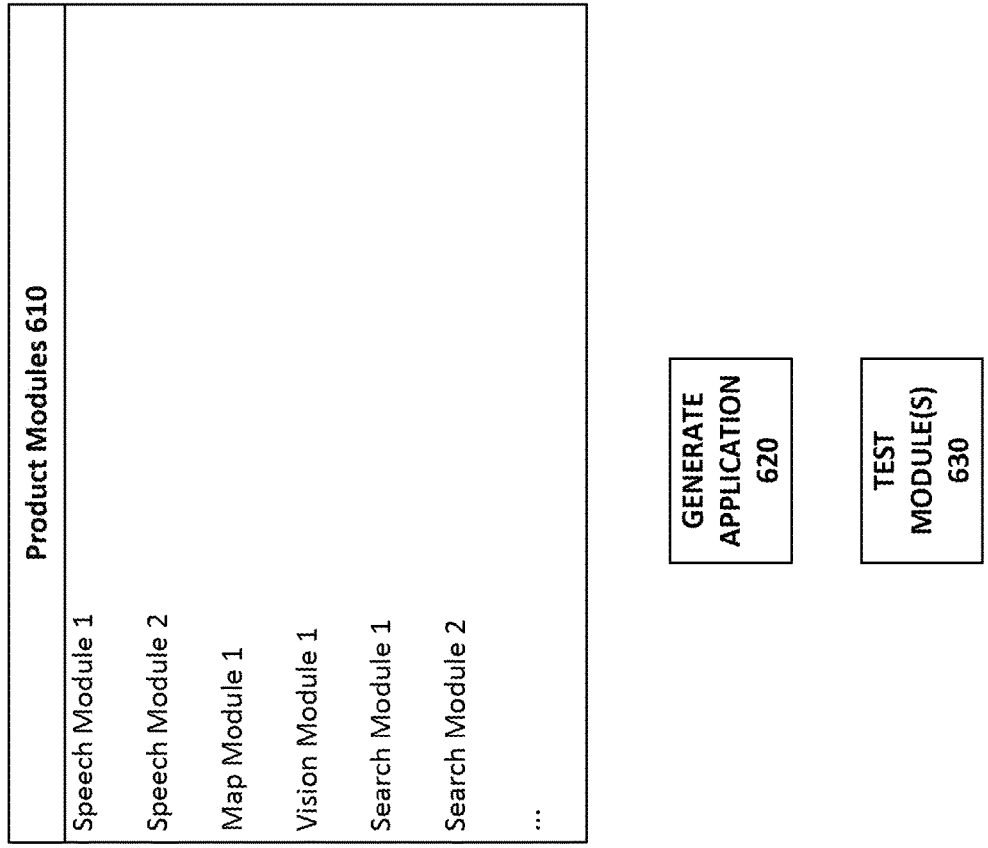
FIG. 6 shows suggested product modules for an application based on the provided application information according to an implementation of the disclosed subject matter.

The server may provide product modules for selection based on the dynamically determined affinity score at operation 135. The server may receive a selection of at least one of the product modules that is provided for selection based on the dynamically determined affinity score at operation 140. The product modules suggested by the server are shown in FIG. 6 and described in detail below. In some implementations, the server may provide the product modules for selection in an order based on the dynamically determined affinity score. That is, product modules with higher and/or more desirable affinity scores may be towards the beginning of the stack (e.g., list), whereas product modules with lower affinity scores or less desirable affinity scores may be placed later in the provided stack.

In some implementations, the server may adjust the affinity scores for the product modules based on an at least one input received at the server. The input may be the selection of one or more product modules by the application developer. The selection of a product module may augment the affinity score for the product module and the corresponding genre which includes the application.

In some implementations, the server may perform a comparative testing of two or more of the selected product modules. Selection of product modules for testing, setting performance goals, and providing testing results is shown in FIGS. 6-8, and are described in detail below. The comparative testing of the two or more selected product modules may be performed by the server testing the two or more selected product modules using predetermined percentages of data, where the data are received by the server and/or retrieved from a storage device coupled to the server.

The server may perform a comparative testing of a first application having a first program module of a first type that is included in the application information with a second application having a second program module that is different from the first program module and is of the first type.

At operation 150, the server may generate an application that integrates the selected product modules with the received application information so that the generated application includes a feature provided by the integrated product modules. That is, the selected product modules add one or more features to the application that is generated by the server. In some implementations, one or more product modules of the application may be selected for testing. When the application has been generated, the server may publish the application by making it available for download by, for example, computing devices 10, 11.

FIG. 2 shows a display 200 to receive application information according to an implementation of the disclosed subject matter. The display 200 includes a file directory 210, where a developer at computing device 10, 11, communicatively coupled to the server 13 via network 7, may select one or more applications (e.g., Application_1, Application_2, or the like), one or more graphics files (e.g., Graphics_1 or the like), one or more video files (e.g., Video_1 of the like), one or more image files (e.g., Images_1, Images_2, or the like), and/or one or more icon files (e.g., Icon_1, Icon_2, or the like) which may be uploaded to the server 13 via the computing device 10, 11. When the developer has selected one or more items displayed in the file directory 210, the developer may select the upload 220 button to upload the selected files to the server 13.

The display 200 may include genre directory 230, which may receive selections from a developer for a genre of the application that the developer would like to develop and publish via an application publishing platform of the server 13. The one or more selectable genres may include, for example, books, business, catalogs, education, entertainment, finance, food & drink, games, health & fitness, lifestyle, medical, music, navigation, news, photo & video, productivity, reference, social networking, sports, travel, utilities, weather, and the like. In some implementations, a sub-genre may be received by the server. For example, the games genre may include the following sub-genres: action, adventure, arcade, board, card, casino, dice, educational, family, kids, music, puzzle, racing, role playing, simulation, sports, strategy, trivia, word, and the like.

FIG. 3 shows a display 300 to receive application information according to an implementation of the disclosed subject matter. The developer may enter in text box 310 a proposed application name for the application to be developed and published, and may select a submit button 320 to finalize the name and provide it to the server 13. The developer may enter a text description for the application to be developed and published in the text box 330, and may select a submit button 340 to finalize the text and provide it to the server 13. The developer may enter keywords related to the application in text box 360, and may select a submit button 370 to finalize the text at provide it to the server 13.

FIG. 4 shows a display 400 to receive application information according to an implementation of the disclosed subject matter. A developer may select a default language for the application to be developed and published by the server 13 from the selectable default language list 410. The default language list 410 may include, for example, English, Spanish, French, Chinese (Mandarin), Japanese, Russian, Hindi/Urdu, Arabic, Portuguese, German, Bengali, and the like. When the developer has finalized their selection of a default language, they may select submit button 420 to provide the default language to the server 13.

The developer may select one or more geographic regions 430 in which the application may be made available when it is generated and published by the server 13. The geographic regions may include, for example, the United States, Canada, Mexico, Europe, the Middle East, South America, Central America, Japan, Korea, China, India, Australia, and the like. The geographic regions may be individual countries and/or regions which include one or more countries. When the developer has finalized their selection of geographic regions, the developer may select the submit button 440 to provide the geographic regions as application information to the server 13.

FIG. 5 shows a display 500 to receive application information according to an implementation of the disclosed subject matter. The display 500 may include a release date text box 510 for a developer to enter an intended release date of the application to be generated and published by the server. When the developer has finalized the release date, the developer may select submit button 520 to provide the release date to the server 13 as application information. The display 500 may provide an application price 530 that may provide selectable prices for the application when it is published. For example, the developer may select the pricing to be free, $0.99, $1.99, $2.99, $3.99, $4.99, or the like. When the developer has finalized pricing for the application, the developer may select the submit button 540 to provide the pricing information to the server 13 as application information.

FIG. 6 shows a display 600 that provides suggested product modules for an application based on the provided application information from displays 200, 300, 400, and/or 500 of FIGS. 2-5 according to an implementation of the disclosed subject matter. Based on the application information received by the server 13 from the displays of FIGS. 2-5, the server 13 may recommend one or more product modules 610. The suggested product modules may be stored, for example, in a storage device coupled to the server 13, a database 15, a remote platform 17, and/or a remote service 11 shown in FIGS. 10-11.

In some implementations, prior to suggesting product modules to a developer, the sever 13 may perform a pre-processing calculation on one or more applications and/or product modules that may be stored, for example, in database 15 and/or remote platform 17 (e.g., which may be a mobile application store). The server 13 may determine significant applications and/or product modules for each genre or category, and for any sub-genre and/or any subcategory. The significance may be determined based on affinity score, frequency of usage, length of time installed, average user rating of the application, number of installations, or the like. The server 13 may determine a statistical correlation between genres or categories used (including any sub-genres and/or subcategories), and may represent the determined statistical correlation with the affinity score. In some implementations of the disclosed subject matter, the affinity score may integrate frequency of API (application programming interface) calls for one or more product modules to determine which product modules of applications are used, and determine the frequency of their use.

Figure 10:
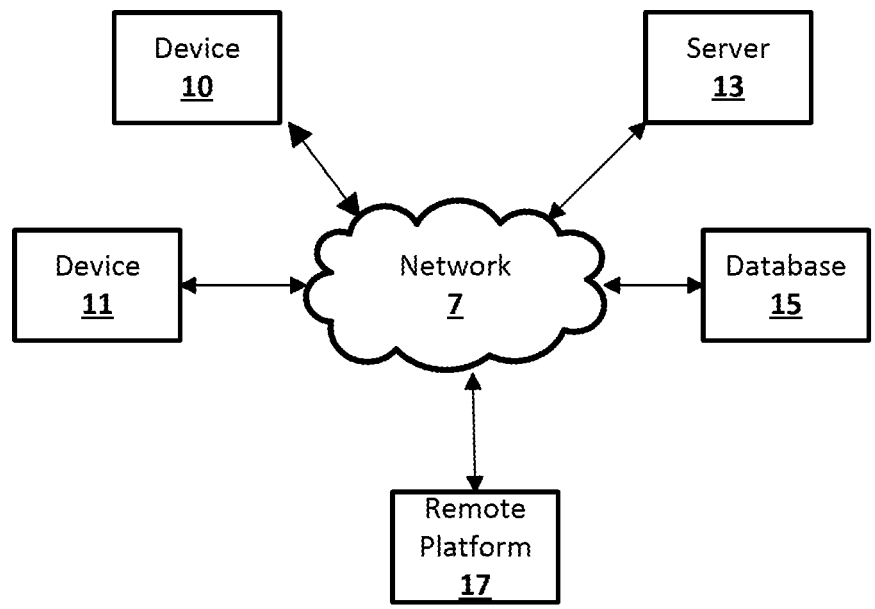
FIG. 10 shows a network configuration according to an implementation of the disclosed subject matter.

The calculation of an affinity score may be based on rule-based machine learning, which may be performed server 13 shown in FIG. 10. The rule-based machine learning may be able to determine relationships and/or the strength of relationships between product modules (and/or APIs), and the category of applications from a large dataset of applications (e.g., where the applications may include games, and where the applications may be stored in the database 15 and/or remote platform 17 shown in FIG. 10). The large dataset of applications may include the applications which may be offered via a mobile application store (e.g., which may be part of database 15 and/or remote platform 17 shown in FIG. 10). In implementations of the disclosed subject matter, the calculation of the affinity score may be performed by the server 13 in two phases, where the first phase may be a pre-processing calculation, and the second phase may be a reinforcement calculation.

In some implementations, the server 13 may utilize machine learning to determine true positive and/or true negative set(s) of applications (i.e., successful and not-so-successful apps, based on usage) from the one or more applications stored, for example, in the database 15 as part of the pre-processing phase (i.e., the first phase) of determining the affinity score. This determined set of applications may be used by the server 13 so as to establish the correlation and weight of the modules of the applications. This pre-processing by the server 13 may be used to perform an initial mapping of <app genre, product modules> tuple(s) across the applications and/or product modules stored in the databased 15. In some implementations, the set of applications and/or the initial mapping of applications may be tested with manual curation.

The pre-preprocessing performed by, for example, the server 13, may utilize an association rule learning method of machine learning. This association rule learning of the pre-processing may be performed over a set of product modules having positive associations and a set of applications and/or product modules having negative associations. For example, the positive associations may include at least a portion of the subset of the most popular applications, and the negative associations may include at least a portion of the subset of least popular applications.

The subset of most popular applications may be determined based on metrics of applications from an application store (e.g., a mobile application store), which may be remote platform 17 and/or database 15 shown in FIG. 10. For example, the popularity of an application may be determined by the average amount of time that an application is installed for (e.g., greater than 30 days, greater than 60 days, greater than 90 days, or the like), an application engagement (e.g., the average usage time over a period of time, such as 30 days, 60 days, or 90 days), an average user rating of the application, the number of user ratings above a threshold rating value, the number of installations (e.g., by general users and/or by influential users), the number of favorable reviews by publications, or the like. The subset of least popular applications may be determined based the number of downloads and/or sales that are below a predetermined threshold level, the average amount of time that the application is installed for before it is uninstalled (e.g., less than 3 days, less than 7 days, less than 14 days, less than 30 days, or the like), the average user rating of the application that is below a predetermined threshold rating value, and the like.

In both the iterations for the positive associations and negative associations, the set of n binary attributes or 'items' may represent the available APIs and/or product modules that the application store (e.g., remote platform 17 shown in FIG. 10) and/or database (e.g., database 15 shown in FIG. 10) may offer. Each application in the positive association subcategory and the negative association subcategory may represent a unique transaction. The set of transactions may be collectively referred to as the database in the association rule learning of the machine learning method performed by server 13. In some implementations, the presence of an 'item' in a 'transaction' (e.g., which may be determined by the server 13, which may perform a static analysis of the product module) does not constitute a positive 'implication'. Rather, an actual usage of the 'item', such as by runtime call of the product module by an application and/or a client-server exchange of data related to the product module may constitute a positive 'implication'.

The association rule may be used by the server 13 to provide a mapping of a successful transaction (e.g., one having a positive 'implication') and the set of items (e.g., {<subcategory_example>}⇒{item1, item2}) which may provide the basis for a normalized affinity score distribution. The association rule may be used by server 13 so that implication rules within items (e.g., if {item1, item2}⇒{item 4}) may be used to provide additional suggestions (e.g., advanced suggestions that may have increased granularity) in the application development environment of the disclosed subject matter.

The following example may illustrate the pre-preprocessing performed by, for example, the server 13, as described above. In this example, <music_player> may be a subcategory of interest under a "Music & Audio" category in the application store. The database or set of transactions in this case may be one or more music_player product modules (e.g., Music_app1_Example1, Music_app2_Example2, Music_app3_Example3, Music_app4_Example4, Music_app5_Example5, Music_app6_Example6_Long_Tail_Music_Player1, Music_app7 Example7_Long_Tail_Music_Player2, and Music_app8_Example8_Long_Tail_Music_Player3, or the like, such as shown in Table 1 below). These applications may represent the positive association (e.g., successful datasets in that subcategory, which may be defined by the length of their installs, such as greater than 30 days of being installed on a computing device, such as device 10, 11 shown in FIG. 10). While the negative association may represent the unsuccessful datasets (e.g., which may be represented by Music_app_longtail_Unsuccessful). The items and/or binary attributes for the "Music & Audio" subcategory may be product modules and/or APIs. For example, these product modules and/or APIs for this subcategory may include "speech_text_api" (e.g., to search songs by voice input), "recommendation_engine" (e.g., to suggest a similar song, artist, and/or playlist), "social_plug-in_module" (e.g., to share a song, album, and/or playlist with others), "authentication api" (e.g., to allow users to sign in and be authenticated), or the like. That is, the association rule applied by the machine learning of server 13 may output a mapping table as shown in Table 1 below. The examples of the applications and their respective values are for illustration purposes only, and other music applications and/or modules may be used. In Table 1, an entry of '1' may represent a positive 'implication', and '0' may represent an absence of an implication:

That is, the affinity value may be a numerical digest and/or value that represents the mapping of applications with product modules and/or APIs as illustrated in Table 1. For example, if 100% of successful transactions (i.e. list of applications) has a positive implication represented by the numerical value 1 above for a binary attribute (e.g., an API and/or product module), then the affinity score for that binary attribute for that subcategory may be 1.00 (e.g., as with Music_app4_Example4). In some implementations, the associations may be expressed as a percentile (e.g., associations appearing 85% of the time may result in an affinity score of 0.85). The example above, which includes Table 1, may be a simple digest. Depending on the cluster density (e.g., if most attributes are between 0.7 and 0.9), a scaling factor may be applied to spread out the distribution.

The end result is a mapping of application subcategory (e.g., the <music_player> subcategory in the example above) and various product modules and/or APIs (e.g., Music_app1_Example1, Music_app2_Example2, Music_app3_Example3, and the like), as explained throughout. For example, in the <music_player> subcategory, the result may be:
{<music_player, user_Authentication_api_module, 1.00>, <music_player, speech_text_api_module, 0.80>, . . . <music_player, vision_api_module, 0.20>}.

In the second phase of calculating the affinity score, the reinforcement calculation may be performed. The derived affinity score (e.g., the first phase pre-processing calculation of the affinity score, as discussed above) for the <app_genre, product_module> tuple may be adjusted based on a developer's feedback. The feedback may include, for example, selection of the product module and/or API for use in an

TABLE 1

| | Module1_speech_text_api | Module2_recommendation_engine | Module3_social_plugin_module |
|---|---|---|---|
| Music_app1_Example 1 | 1 | 1 | 1 |
| Music_app2_Example2 | 0 | 1 | 0 |
| Music_app3_Example3 | 1 | 1 | 0 |
| Music_app4_Example4 | 1 | 1 | 1 |
| Music_app5_Example5 | 1 | 1 | 1 |
| Music_app6_LongTail_Music_Player1 | 0 | 1 | 0 |
| Music_app7_LongTail_Music_Player2 | 0 | 0 | 1 |
| Music_app8_LongTail_Music_Player3 | 0 | 0 | 0 |

| | Module4_vision_api | Module5_user_Authentication_api |
|---|---|---|
| Music_app1_Example 1 | 0 | 1 |
| Music_app2_Example2 | 0 | 1 |
| Music_app3_Example3 | 0 | 1 |
| Music_app4_Example4 | 1 | 1 |
| Music_app5_Example5 | 0 | 1 |
| Music_app6_LongTail_Music_Player1 | 1 | 1 |
| Music_app7_LongTail_Music_Player2 | 0 | 1 |
| Music_app8_LongTail_Music_Player3 | 1 | 0 |

For example, as shown above in Table 1, Music_app1_Example1 may have positive implications for Module1_speech_text_api, Module2_recommendation_engine, Module3_social_plugin_module, and Module5_user_Authentication_api, but may not have an implication for Module4_vision_api. Music_app4_Example4 may have positive implications for all of the product modules and/or APIs for the subcategory <music_player>, including Module1_speech_text_api, Module2_recommendation_engine, Module3_social_plugin_module, Module4_vision_api, and Module5_user_Authentication_api.

application being developed, selection of a related product module and/or API for use in the application being developed, the declining of a recommendation for a product module and/or API, or the like.

The reinforcement calculation of the second phase may include presenting the modules to the developer based on the subcategory (e.g., the <music_player> subcategory in the example above). The feedback from developers may be used to adjust the affinity score. In some implementations, the adjustment of the affinity score may be periodically adjusted and/or continuously adjusted based on developer feedback. An affirmative use of the module (e.g., selection of the module for an application to be developed, or the like) may augment the score, and a negative signal input (e.g., such as input from the developer to decline to use the module for an application to be developed) from the developer may reduce the affinity score. In some implementations, the developer feedback may weighted lower in the affinity score calculation than the first phase of affinity score calculation, which uses the association rule mapping. That is, the first phase of the calculation is given more weight, as there may be subjectivity and/or factors involved in the developer's feedback. In some implementations, a dampening factor may be applied to the feedback received from developer. For example, a scale factor of 0.1 (or lower for feedback with modules and/or APIs with a large range in the feedback provided by developers—i.e., noisy feedback) may be applied to the feedback from the developer. This scale factor may indicate that 10 affirmative (or negative) developer feedback instances would count as 1 affirmative (or negative) in the affinity score calculation. This may adjust the score by 0.1 percent.

The initial tuple mapping and affinity scores from above pre-processing may be reinforced and/or refined using developer feedback when product modules 610 are suggested in display 600 shown in FIG. 6, and as discussed in detail below. This may be performed by the server 13 as part of the second phase of calculating the affinity score, which is the reinforcement calculation. An affirmative use of the module (i.e., selection of one or more product modules 610 by a developer) may augment the affinity score (i.e., increase the affinity score), while a negative signal input from the developer (e.g., an input received by the server 13 that one or more of the product modules 610 is not relevant or useful) may reduce the tuple affinity score.

In an example of using affinity scores, a developer may select a photography genre from the list of genres 230 in display 200 of FIG. 2 so that the server 13 determines that the developer would like to generate a photography application. The developer may also enter text and/or related description in display 300, such as the application name 310, application description 330, and keywords 360 such that the server 13 may determine that the developer would like to generate a photography application. The server 13 may determine that a photography application would have a higher affinity score for vision modules than the affinity score for a music application for the same modules. A vision module (having a vision API) may be useful to a photography application, as such a module may be used to recognize faces, objects, places, context and meaning of images, and the like. Using a popular application as an example for the genre or category, this can be expressed as:
affinity_score (Popular_Photog_App, <vision_api>)>affinity_score (Popular_Music_App, <vision_api>)

The affinity score for a SpeechToText module (having a SpeechToText API, where SpeectToText modules may help convert a voice input to text input) is likely much higher for Popular_Music_App than for Popular_Photog_App, as shown in the example affinity score relationship below:
affinity_score (Popular_Photog_App, <speech_text_api>)
<affinity_score (Popular_Music_App, <speech_text_api>)

For this example, the affinity score list may have the format {sub_genre, module, affinity_score} would look something like the below:
{<photography, vision_api_module, 0.9>, . . .
<photography, speech_text_api_module, 0.2>}
{<music_player, speech_text_api_module, 0.85>, . . .
<music_player, vision_api_module, 0.10>}

The database 15 may include a plurality of such lists, and the server 13 may generate different lists based on <precision, recall> sensitivity. In pattern recognition, information retrieval, and binary classification, precision (also called positive predictive value) may be the fraction of relevant instances among the retrieved instances, while recall (also known as sensitivity) may be the fraction of relevant instances that have been retrieved over the total amount of relevant instances. Both precision and recall may be based on relevance. The server 13 and/or the developer may set the <precision, recall> sensitivity before the server 13 generates affinity_score lists and/or retrieves such lists from the database 15, such as shown in the example above.

The database 15 may include modules that are developed by third parties (i.e., another party from the application development platform provider). In another example, the 3DGraphics_module (e.g., a product module for three-dimensional graphics generation) and Gaming_module (e.g., a gaming engine module) may be modules that are developed by third parties.

For this example, the affinity score list may have the format {sub_genre, module, affinity_score} would look something like the below:
{<game_adventure, 3DGraphics_module, 0.9>, <game_adventure, Gaming_module, 0.9>, . . . <game_adventure, maps_api, 0.5>}
{<real_estate_finder, maps_api, 0.99>, . . . <real_estate_finder, 3DGraphics_module, 0.1>, <real_estate_finder, Gaming_module, 0.1>}

In the above example, the game engines developed by third parties (i.e., 3DGraphics_module and Gaming_module) may be highly relevant to adventure genres in games (as they have affinity scores of 0.9), while the maps module (i.e., maps_api) may be less useful (as it has an affinity score of 0.5), based on affinity score. For a real estate application, the maps module (i.e., maps_api) may be highly relevant (with an affinity score of 0.99), while the game engine modules (i.e., 3DGraphics_module and Gaming_module) for real-estate applications may be less relevant (i.e., as they have 0.1 affinity scores).

As shown in FIG. 6, the developer may select one or more product modules 610 suggested by the server to use with the application to be generated by the server 13. The product modules 610 are presented for selection based on the inputted application information and the pre-processed affinity scores of related modules. As shown in display 600, the suggested product modules may include a speech module, a map module, a vision module (e.g., to recognize faces, objects, places, context and meaning of images, and the like), a search module, or the like. The suggested product modules may differ based on the genre of the application, and based on the application information provided by the developer in displays 200, 300, 400, and/or 500. When the developer has finalized the selection of product modules to add to the application, the developer may select the generate application button 620, and the server 13 may generate the application to be published with the selected product modules. The developer may test one or more of the product modules with the application by selecting test module(s) button 630.

Implementations of the disclosed subject matter may include testing product modules, as well as testing results, as shown in FIGS. 7-8 and described in detail below. This may provide developers with an ability to compare various modules and/or APIs modules using selected dataset and/or real-world traffic to a generated application. For example, the database 15 may include a plurality of "speech to text" modules and/or APIs from a variety of different parties. Some application developers may have difficulty in determining what modules and/or APIs are available, and knowing which one is best suited for their application to be developed and published. As shown in FIG. 6 and discussed in detail above, the server 13 may suggest product modules 610 that may be relevant for an application that a developer is attempting to generate and publish. One or more of the product modules 610 may be selected, and may be tested by selecting the test modules button 630.

Various versions of application packages ("apk") may be constructed in real-time by the server 13 with, for example, different "speech to text" modules or other modules which may be subject to a percent of traffic to compare the performance. The server 13 may present options to a developer for selection of product modules to be tested, and the performance goals for each function. For example, as discussed in detail below, display 700 of FIG. 7 shows four different speech modules to be tested using the performance goals 740. The performance goals may be developer-specified or may be predetermined at the server 13. When the test button 750 is selected, the performance of the modules for the selected product modules may be determined for the assigned percentages (in this example, 25%) of the data traffic. The display 800 shown in FIG. 8 that includes testing results for the performance watchlists 810, 820 may be generated by the server 13. The developer may use the generated testing results to determine selection or removal of product modules from an application.

FIG. 7 shows a display 700 for testing of product modules 610 selected in display 600 of FIG. 6 according to an implementation of the disclosed subject matter. For testing the product modules, one or more module configurations 710 may be used. For example, as shown in modules configuration 710 of display 700, the Module_config_1 may include a Product Module 720 to be tested (e.g., Speech Module 1), and a selection of the amount or proportion of data and/or "traffic" that an application receives (e.g., 25%) to test the performance of the module with traffic selection percentage 730. As shown in display 700, each module configuration may have a different product module and a different percentage of data and/or traffic for the module to be tested with. Although display 700 shows that each module configuration has an equal 25% of traffic to be tested with, this is merely an example, and different modules may use different traffic percentages.

One or more performance goals to test the product modules against may be specified in performance goals 740. For example, a performance watchlist 1 may determine a goal for the percentage of a search completed using the Module_config_1, Module_config_2, Module_config_3, and Module_config_4, and a performance watchlist 2 may determine a goal for the percentage of utterances recognized using the speech modules of these configurations. When the testing product modules and the performance goals have been finalized, the developer may select the test button 750 to test the module configurations. The test results after selection of the test button 750 may be shown in FIG. 8.

FIG. 8 shows product module testing results display 800 according to an implementation of the disclosed subject matter. The display 800 may show the results of the performance watchlist 1 in display 810, where the performance of the speech modules to be tested are ranked based on the percentage of searches completed. For performance watchlist 1, the modules have the results ranking of: Speech Module 3 (93% of searches completed); Speech Module 1 (86% of searches completed), Speech Module 4 (72% of the searches completed), and Speech Module 2 (66% of the searches completed). The display 800 may include the results from performance watchlist 2 in display 820, where the performance of the speech modules to be tested are ranked based on the percentage of utterances recognized. For performance watchlist 2, the modules have the results ranking of: Speech Module 1 (84% of utterances recognized); Speech Module 4 (78% of utterances recognized), Speech Module 3 (75% of utterances recognized), and Speech Module 2 (68% of utterances recognized).

Based on the search results, the developer may modify the modules of the application so as to remove or replace the modules that are not performing as desired, and may re-generate and publish the application.

In situations in which the systems discussed here collect personal information about users (e.g., developers), or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 9:
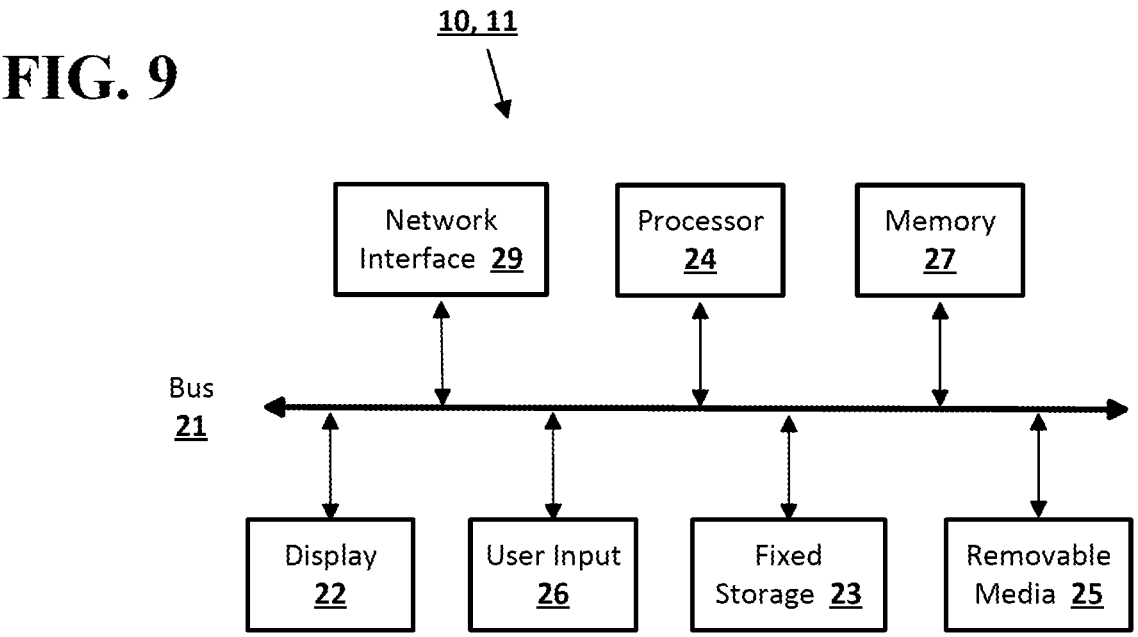
FIG. 9 shows a computing device according to an implementation of the disclosed subject matter.

Implementations of the presently disclosed subject matter may be implemented in and used with a variety of component and network architectures. FIG. 9 is an example computing device 10, 11 suitable for implementing embodiments of the presently disclosed subject matter. The device 10, 11 may be, for example, a desktop or laptop computer, or a mobile computing device such as a smart phone, tablet, or the like. The device 10, 11 may include a bus 21 which interconnects major components of the computing device 10, 11, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computing device 10, 11 are generally stored on and accessed via a computer readable medium, such as a hard disk drive (e.g., fixed storage 23), an optical drive, floppy disk, or other storage medium.

The fixed storage 23 may be integral with the computing device 10, 11 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, removable media 25, or on a remote storage location.

FIG. 10 shows an example network arrangement according to an implementation of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 11:
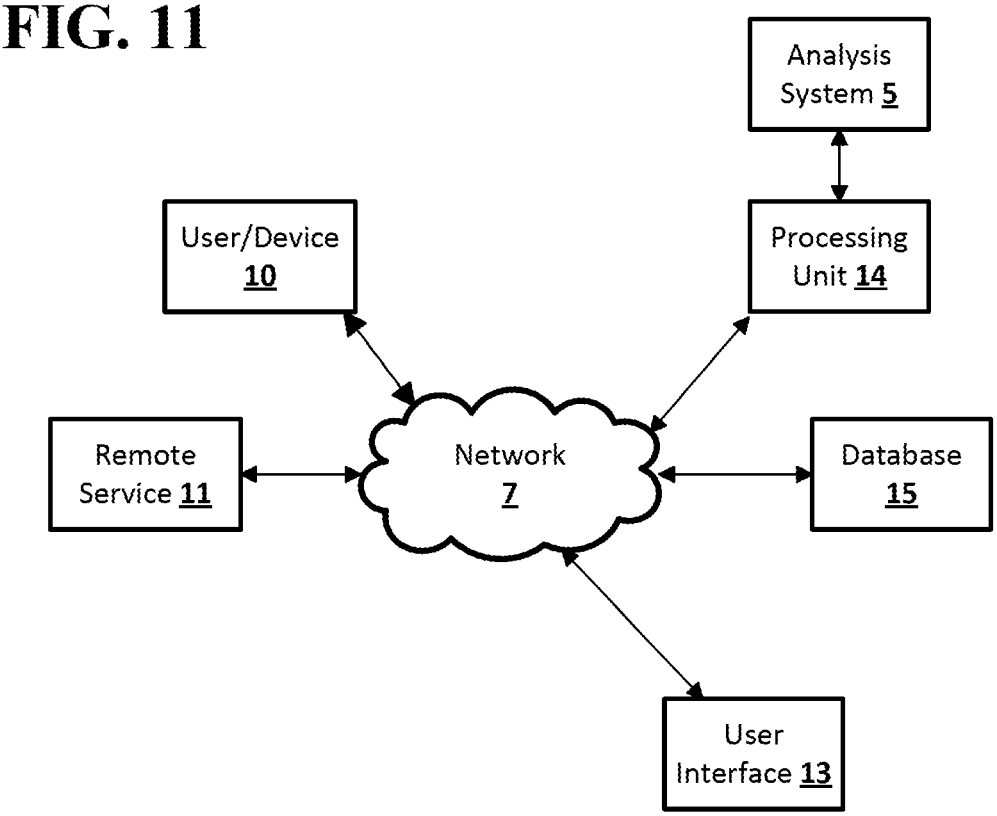
FIG. 11 shows an example network and system configuration according to an implementation of the disclosed subject matter.

FIG. 11 shows an example arrangement according to an implementation of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:
1. A method comprising:
  receiving, at a server having a mobile application publishing platform, application information including an application having one or more product modules;

prior to publishing the application via the mobile application publishing platform:
determining, at the server and based on the application information, a plurality of related product modules;
dynamically determining, at the server, an affinity score for each product module from the plurality of related product modules;
providing, by the server and based on the affinity score, at least one of the plurality of related product modules for selection;
responsive to receiving a request to test one or more of the at least one of the plurality of related product modules for a performance goal, determining, at the server, respective performance levels for the one or more of the at least one of the plurality of related product modules;
providing, by the server and based on the respective performance levels, an updated indication of the at least one of the plurality of related product modules;
receiving, at the server, a selection of a product module from the at least one of the plurality of related product modules; and
generating, at the server, an updated application that includes the selected product module in place of one of the one or more product modules of the application; and
publishing, by the server, the updated application via the mobile application publishing platform.

2. The method of claim 1, wherein the application information further includes one or more of a description of an application, images, audio, or video.

3. The method of claim 1, wherein the application information further includes an identification of a genre type of the application, and wherein the affinity score for each product module from the plurality of related product modules is dynamically determined based at least in part on the genre type of the application.

4. The method of claim 1, wherein dynamically determining the affinity score further comprises:
determining, at the server, whether each product module of a set of product modules has a positive implication with one or more applications from a set of applications, wherein the positive implication is based on use of each of the set of product modules by the set of applications;
generating, at the server, a mapping of the positive implications for each of the set of product modules to the set of applications; and
determining, at the server and based on the mapping, the affinity score for each product module of the plurality of related product modules.

5. The method of claim 4, wherein the affinity score is adjusted based on developer input received at the server, wherein the developer input includes a developer selection of a product module or a developer input to decline to use a product module.

6. The method of claim 5, further comprising:
applying a dampening factor to the developer input; and
adjusting the affinity score based on the developer input and the dampening factor.

7. The method of claim 1, further comprising:
determining, at the server, a genre type of the application based on the application information;
determining, at the server, one or more existing applications in a storage device coupled to the server, with each having a genre type that corresponds to the genre type of the application; and
determining, at the server, a respective relevance of each of one or more product modules used by the one or more existing applications.

8. The method of claim 7, wherein determining the respective relevance of each of the one or more product modules comprises:
determining, at the server, a statistical correlation between the genre type and each of the one or more product modules used by the one or more existing applications based on a frequency of application programming interface calls by the one or more existing applications to the one or more product modules; and
determining, at the server and based on the statistical correlation, the affinity score for each of the one or more product modules.

9. The method of claim 8, further comprising:
generating, at the server, a tuple mapping that includes the genre type and the one or more product modules; and
revising, at the server, the tuple mapping and the affinity score based on at least one of a usage of the one or more product modules or a received input to the server.

10. The method of claim 1, further comprising:
performing, at the server, a comparative testing of a first application having a first product module of a first type, with a second application having a second product module that is different from the first product module and is of the first type.

11. A system comprising:
a storage device storing instructions for a mobile application publishing platform; and
a server comprising a communications interface and one or more processors, wherein the server is communicatively coupled to the storage device, and the instructions, when executed by the one or more processors, cause the one or more processors to:
receive, via the communications interface, application information including an application having one or more product modules;
prior to publishing the application via a mobile application publishing platform:
determine, based on the application information, a plurality of related product modules stored in the storage device;
dynamically determine an affinity score for each product module from the plurality of related product modules;
provide, based on the affinity score, at least one of the plurality of related product modules for selection;
responsive to receiving, via the communications interface, a request to test one or more of the at least one of the plurality of related product modules for a performance goal, determine respective performance levels for the one or more of the at least one of the plurality of related product modules;
provide, based on the respective performance levels, an updated indication of the at least one of the plurality of related product modules;
receive, via the communications interface, a selection of a product module from the at least one of the plurality of related product modules; and
generate an updated application that includes the selected product module in place of one of the one or more product modules of the application; and
publish the updated application via the mobile application publishing platform.

12. The system of claim 11, wherein the application information further includes one or more of a description of an application, images, audio, or video.

13. The system of claim 11, wherein the application information further includes an identification of a genre type of the application, and wherein the affinity score for each product module from the plurality of related product modules is dynamically determined based at least in part on the genre type of the application.

14. The system of claim 11, wherein the instructions further cause the one or more processors to dynamically determine the affinity score by at least causing the one or more processors to:
   determine whether each product module of a set of product modules has a positive implication with one or more applications from a set of applications, wherein the positive implication is based on use of each of the set of product modules by the set of applications;
   generate a mapping of the positive implications for each of the set of product modules to the set of applications; and
   determine, based on the mapping, the affinity score for each product module of the plurality of related product modules.

15. The system of claim 14, wherein the affinity score is adjusted based on
   developer input received at the server,
   wherein the developer input includes a developer selection of a product module or a developer input to decline to use a product module.

16. The system of claim 15, wherein the instructions further cause the one or more processors to apply a dampening factor to the developer input, and adjusts the affinity score based on the developer input and the dampening factor.

17. The system of claim 11, wherein the instructions further cause the one or more processors to:
   determine a genre type of the application based on the application information;
   determine one or more existing applications in the storage device, wherein each existing application from the one or more existing applications is associated with a genre type that corresponds to the genre type of the application, and
   determine a respective relevance of each of one or more product modules used by the one or more existing applications.

18. The system of claim 17, wherein the instructions further cause the one or more processors to determine the respective relevance of each of the one or more product modules by at least causing the one or more processors to:
   determine a statistical correlation between the genre type and each of the one or more product modules used by the one or more existing applications based on a frequency of application programming interface calls by the one or more existing applications to the one or more product modules; and
   determine, based on the statistical correlation, the affinity score for each of the one or more product modules.

19. The system of claim 18, wherein the instructions further cause the one or more processors to generate a tuple mapping that includes the genre type and the one or more product modules.

20. The system of claim 19, wherein the instructions further cause the one or more processors to revise the tuple mapping and the affinity score based on at least one of a usage of the one or more product modules and a received input to the server.

21. The system of claim 11, wherein the instructions further cause the one or more processors to perform a comparative testing of a first application having a first product program module of a first type, with a second application having a second product module that is different from the first product module and is of the first type.

* * * * *